United States Patent
Jung et al.

(10) Patent No.: US 8,490,515 B2
(45) Date of Patent: Jul. 23, 2013

(54) SPEED CONTROLLER FOR MOTOR PREVENTING INTERFERENCE FROM REVERSE INPUT

(75) Inventors: Tae-Jin Jung, Chungcheongbuk-do (KR); Hyuk Yoo, Chungcheongbuk-do (KR)

(73) Assignee: MBI Co., Ltd., Cheongju-Si (KR)

( * ) Notice: Subject to any disclaimer, the term of this patent is extended or adjusted under 35 U.S.C. 154(b) by 272 days.

(21) Appl. No.: 12/933,469

(22) PCT Filed: Mar. 18, 2009

(86) PCT No.: PCT/KR2009/001373
§ 371 (c)(1),
(2), (4) Date: Sep. 20, 2010

(87) PCT Pub. No.: WO2009/116802
PCT Pub. Date: Sep. 24, 2009

(65) Prior Publication Data
US 2011/0015027 A1    Jan. 20, 2011

(30) Foreign Application Priority Data
Mar. 21, 2008  (KR) ........................ 10-2008-0026273

(51) Int. Cl.
*F16H 3/74* (2006.01)
(52) U.S. Cl.
USPC .................... 74/810.1; 192/48.92; 475/12
(58) Field of Classification Search
USPC ............ 74/810.1, 810.2; 192/3.52, 44, 48.92; 475/142, 297, 258
See application file for complete search history.

(56) References Cited

U.S. PATENT DOCUMENTS

| | | | | |
|---|---|---|---|---|
| 743,867 | A * | 11/1903 | Head | 74/363 |
| 1,782,605 | A * | 11/1930 | Farley | 192/47 |
| 2,332,061 | A * | 10/1943 | Conkle | 188/82.4 |
| 3,406,798 | A * | 10/1968 | Curran | 192/35 |
| 4,083,419 | A * | 4/1978 | Fogelberg | 180/233 |
| 4,305,599 | A * | 12/1981 | Houston | 280/212 |
| 4,373,407 | A | 2/1983 | Okubo | |
| 4,813,299 | A | 3/1989 | Hamane et al. | |
| 4,970,915 | A * | 11/1990 | Williams, III | 74/810.1 |
| 5,103,950 | A * | 4/1992 | Ito et al. | 192/35 |
| 5,785,625 | A * | 7/1998 | Matsuo et al. | 475/297 |
| 6,142,904 | A * | 11/2000 | Yoo | 475/12 |

(Continued)

FOREIGN PATENT DOCUMENTS

| | | |
|---|---|---|
| JP | 2005-325862 A | 11/2005 |
| JP | 2007-225103 A | 9/2007 |

*Primary Examiner* — Troy Chambers
*Assistant Examiner* — Valentin Craciun
(74) *Attorney, Agent, or Firm* — LRK Patent Law Firm

(57) ABSTRACT

A transmission for a motor, which gives a normal rotation and constant speed output to an output cover when a driving shaft of the motor rotates in a normal direction and a normal rotation and speed-changed output to the output cover when the driving shaft of the motor rotates in a reverse direction, is provided. Interference caused by a reverse input can be prevented although rotation is reversely input from the output cover. The driving shaft includes a polygonal outer circumference; a ball-mounting ring is coupled to the outer circumference, the ball-mounting ring including, therein a constant speed ball and a speed changing ball spaced apart from each other by a predetermined distance so that upper and lower sides of them protrude; and the ball-mounting ring is frictionally fixed by an additionally fixed friction pin.

1 Claim, 7 Drawing Sheets

U.S. PATENT DOCUMENTS

| | | | |
|---|---|---|---|
| 6,383,107 B1 * | 5/2002 | Yoo | 475/12 |
| 6,383,108 B1 * | 5/2002 | Yoo | 475/12 |
| 6,719,670 B1 * | 4/2004 | Wu et al. | 482/57 |
| 7,832,542 B2 * | 11/2010 | Byun | 192/223.2 |

* cited by examiner (a)  (b)

SPEED CONTROLLER FOR MOTOR PREVENTING INTERFERENCE FROM REVERSE INPUT

BACKGROUND OF THE INVENTION

1. Field of the Invention

The present invention relates to a speed controller for motor, and more particularly, to a speed controller for motor preventing interference from reverse input, which is configured to rotate only in one direction when being driven in normal and reverse directions and has a function of preventing interference caused by a reverse input to prevent a shutdown of the operation of the speed controller by dispersing the reverse input and receiving only one direction input when rotating force is reversely input from an output side.

2. Description of the Related Art

Generally, a rotation device, such as a carrier or industrial machine, obtains driving force from a motor. In this case, the rotating force output from the motor may be transferred through an additional transmission. In other cases, a transmission may be provided in the motor itself so that the rotating force may be output directly or through an additional transmission.

In a case where a transmission is provided in a motor itself, two pawls 11 and 12 are generally mounted to a driving shaft 10 as shown in FIG. 1 so that any one pawl (constant speed pawl) 11 is directly restricted to an output unit 20 and the other pawl (speed changing pawl) 12 is restricted to the output unit 20 via a speed changing means.

More specifically, the constant speed pawl 11 bent clockwise is mounted to one side of the outer circumference of the driving shaft 10, and the constant speed pawl 11 is directly restricted at a portion 20a to the output unit 20. Also, the speed changing pawl 12 bent counterclockwise is mounted to the other side of the outer circumference of the driving shaft 10, and the speed changing pawl 12 is restricted at a portion 30a to a sun gear 30. Then, the sun gear 30 is engaged with a planetary gear 40, and the planetary gear 40 is engaged with the output unit 20.

Thus, if the driving shaft 10 of the motor (not shown) rotates in a normal direction, the constant speed pawl 11 is restricted to the output unit 20 to give a normal direction output, while if the driving shaft 10 rotates in a reverse direction, the speed changing pawl 12 is restricted to a speed changing means to give a speed-changed normal direction output to the output unit 20.

However, if the driving shaft 10 does not rotate in the transmission for a motor and rotation is reversely input from the output unit 20 by external force, the output unit 20 is rotated counterclockwise, so that the output unit 20 and the constant speed pawl 11 are restricted to each other first. Also, the output unit 20 rotating counterclockwise makes the planetary gear 40 rotate clockwise, the planetary gear 40 rotates the sun gear 30 counterclockwise, and then, the sun gear 30 is restricted to the speed changing pawl 12.

Thus, when the output unit 20 rotates counterclockwise, the constant speed pawl 11 and the speed changing pawl 12 are all restricted, so that the transmission does not work.

SUMMARY OF THE INVENTION

The present invention is conceived to solve the aforementioned problems. An object of the present invention is to provide a speed controller for motor preventing interference from reverse input, wherein when pawls are coupled to a driving shaft, any one of the two pawls is not restricted even in any position so that the two pawls do not interfere with each other although a reverse input is made.

The present invention for achieving the objects provides a speed controller for motor preventing interference from reverse input, which gives a normal rotation and constant speed output to an output cover when a driving shaft of the motor rotates in a normal direction and a normal rotation and speed-changed output to the output cover when the driving shaft of the motor rotates in a reverse direction, wherein a key is formed to protrude on an outer circumference of the driving shaft; a pawl-mounting ring having a key groove with a greater width than the key is coupled to the key; a constant speed pawl and a speed changing pawl having opposite directions are mounted to the pawl-mounting ring so that lower portions of them extend to the key groove; and the pawl-mounting ring is frictionally fixed by an additionally fixed friction pin, whereby at least one of the constant speed pawl and the speed changing pawl is made lie down by the key according to a rotation direction of the driving shaft.

Also, the present invention provides a speed controller for motor preventing interference from reverse input, which gives a normal rotation and constant speed output to an output cover when a driving shaft of the motor rotates in a normal direction and a normal rotation and speed-changed output to the output cover when the driving shaft of the motor rotates in a reverse direction, wherein the driving shaft has a polygonal outer circumference; a ball-mounting ring is coupled to the outer circumference, the ball-mounting ring including therein a constant speed ball and a speed changing ball spaced apart from each other by a predetermined distance so that upper and lower sides of them protrude; and the ball-mounting ring is frictionally fixed by an additionally fixed friction pin, whereby at least one of the constant speed ball and the speed changing ball escapes from the outer circumference according to a rotation direction of the driving shaft.

Here, the outer circumference may have a side with a concavely curved shape.

Further, the outer circumference may have a side with a concavely angled shape.

Furthermore, the outer circumference may have a side with a wave shape.

DESCRIPTION OF THE PREFERRED EMBODIMENT

Hereinafter, preferred embodiments of a speed controller for motor preventing interference from reverse input according to the present invention will be described in detail with reference to the accompanying drawings.

Figures 1, 2:
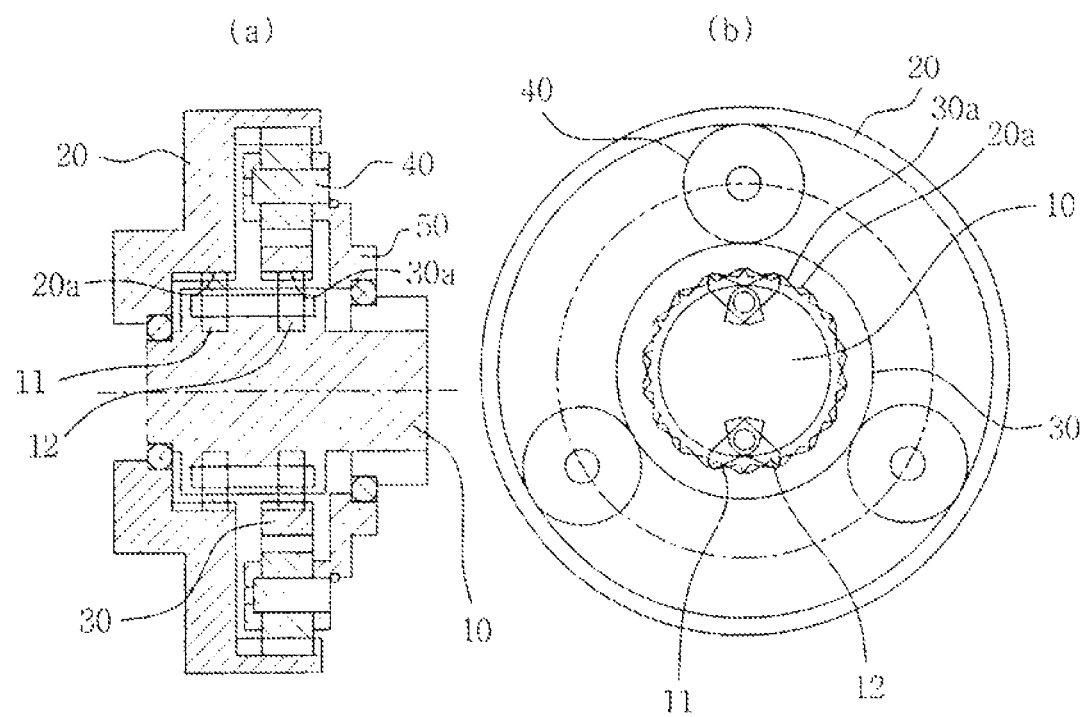
FIG. 1 is a view showing a transmission for a motor which gives a constant speed output and a speed-changed output in one direction.
FIG. 2 is a sectional view showing a speed controller for motor preventing interference from reverse input according to a first embodiment of the present invention.
Figure 3:
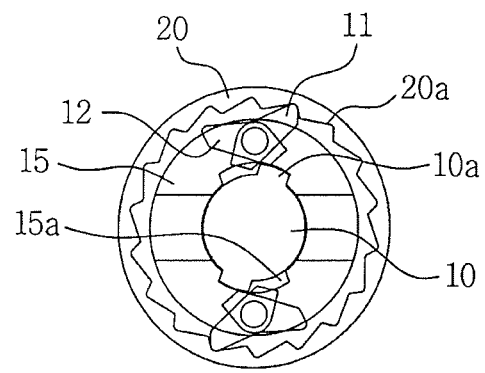
FIG. 3 is a side view showing a pawl-mounting ring of FIG. 2.
Figure 4:
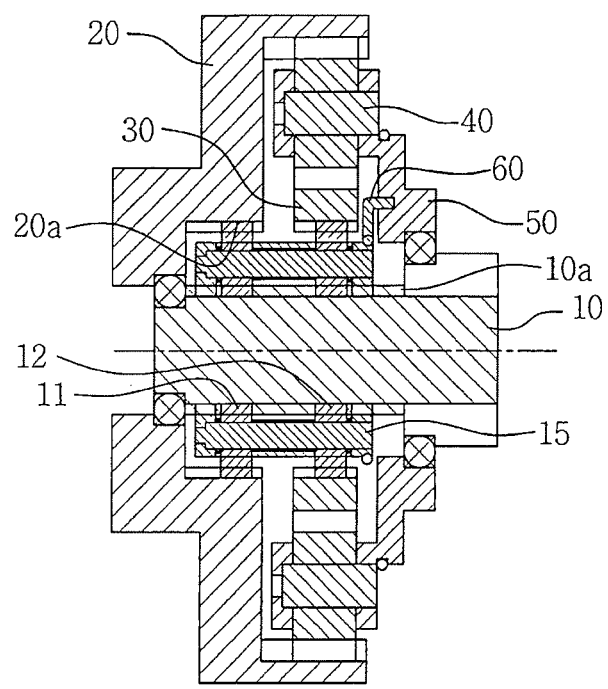
FIG. 4 is a sectional view showing another example wherein a friction pin shown in FIG. 2 is mounted.

FIG. 2 is a sectional view showing a speed controller for motor preventing interference from reverse input according to a first embodiment of the present invention, FIG. 3 is a side view showing a major portion of a pawl-mounting ring of FIG. 2, and FIG. 4 is a sectional view showing another example wherein a friction pin shown in FIG. 2 is mounted.

Referring to FIGS. 2 and 3, a speed controller 100 for motor preventing interference from reverse input according to the first embodiment of the present invention includes a driving shaft 10 rotating in normal and reverse directions, a pawl-mounting ring 15 surrounding an outer circumference of the driving shaft 10, a constant speed pawl 11 and a speed changing pawl 12 coupled to the pawl-mounting ring 15, an output cover 20 restricted at a portion 20*a* to the constant speed pawl 11, a sun gear 30 restricted at a portion 30*a* to the speed changing pawl 12, a planetary gear 40 engaged with the sun gear 30 at its inner side and the output cover 20 at its outer side, and a friction pin 60 for giving frictional force to the pawl-mounting ring 15.

First, the driving shaft 10 and the pawl-mounting ring 15 transmit rotation through a key 10*a* formed on the outer circumference of the driving shaft 10 and a key groove 15*a* formed on an inner side of the pawl-mounting ring 15. The key groove 15*a* is designed to have a greater width than the key 10*a*.

Also, the constant speed pawl 11 and the speed changing pawl 12 mounted to the pawl-mounting ring 15 and having opposite directions are elastically supported by a spring (not shown) to always erect. In addition, lower portions of the constant speed pawl 11 and the speed changing pawl 12 extend to protrude toward the key groove 15*a*. An end of the key 10*a* is positioned between the constant speed pawl 11 and the speed changing pawl 12, which are mounted to cross each other, as shown in FIG. 3, so that the key 10*a* serves to make the constant speed pawl 11 and the speed changing pawl 12 erect or lie down.

The pawl-mounting ring 15 formed as described above is rotated just by means of the key 10*a* and the key groove 15*a* and is frictionally fixed by means of a friction pin 60 in order not to return or run idle.

That is, the friction pin 60 is mounted to the rotating sun gear 30 or the output cover 20 as shown in FIG. 2 to press the outer circumference of the pawl-mounting ring 15. Alternatively, the friction pin 60 may be configured such that it is mounted to a fixed frame 50 of the speed controller 100 for a motor as shown in FIG. 4 to press the outer circumference of the pawl-mounting ring 15.

Figure 5:
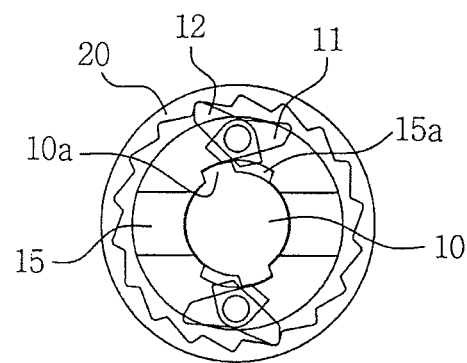
FIGS. 5 and 6 are side views illustrating the operation of the pawl-mounting ring of FIG. 2.
Figure 6:
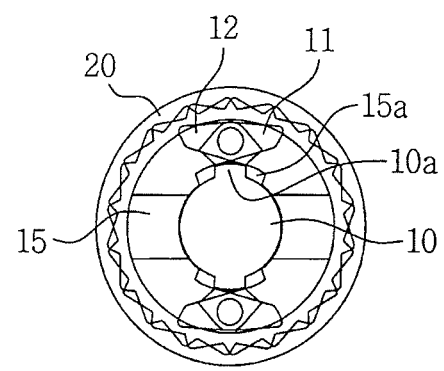

FIGS. 5 and 6 are side views illustrating the operation of the speed controller for motor preventing interference from reverse input according to the first embodiment of the present invention.

When the driving shaft 10 stops while rotating in the normal direction, the speed controller 100 preventing interference from reverse input according to the first embodiment of the present invention erects only the constant speed pawl 11 and makes the speed changing pawl 12 lie down as shown in FIG. 3. Thus, in such a state, if rotation is reversely transferred from the output cover 20 counterclockwise, the output cover 20 transmits the reverse rotation toward both of the constant speed pawl 11 and the planetary gear 40.

First, the rotation reversely input from the output cover 20 toward the constant speed pawl 11 is restricted at the portion 20*a* to the constant speed pawl 11 while rotating counterclockwise, and the pawl-mounting ring 15 rotates counterclockwise by the rotation of the constant speed pawl 11. Also, the pawl-mounting ring 15 rotates the driving shaft 10 in the reverse direction by means of the key groove 15*a* and the key 10*a*.

Then, the rotation reversely input from the output cover 20 toward the planetary gear 40 rotates counterclockwise and makes the planetary gear 40 rotate clockwise, and the planetary gear 40 rotates the sun gear 30 counterclockwise. Also, the sun gear 30 rotating counterclockwise is not restricted at the portion 30*a* to the speed changing pawl 12 but runs idle, thereby not transmitting the reversely input rotation toward the driving shaft 10.

Meanwhile, when the driving shaft 10 stops while rotating in the reverse direction, the speed controller 100 for a motor makes the constant speed pawl 11 lie down and erects the speed changing pawl 12 as shown in FIG. 5. Also, if the driving shaft 10 stops intermediately while rotating in either the normal direction or the reverse direction, both of the constant speed pawl 11 and the speed changing pawl 12 are made lie down.

Thus, in the speed controller 100 for a motor according to the first embodiment of the present invention, one or both of the constant speed pawl and the speed changing pawl are made lie down in any state, even when rotation is reversely input from the outside.

Hereinafter, a speed controller for motor preventing interference from reverse input according to a second embodiment of the present invention will be described.

Figure 7:
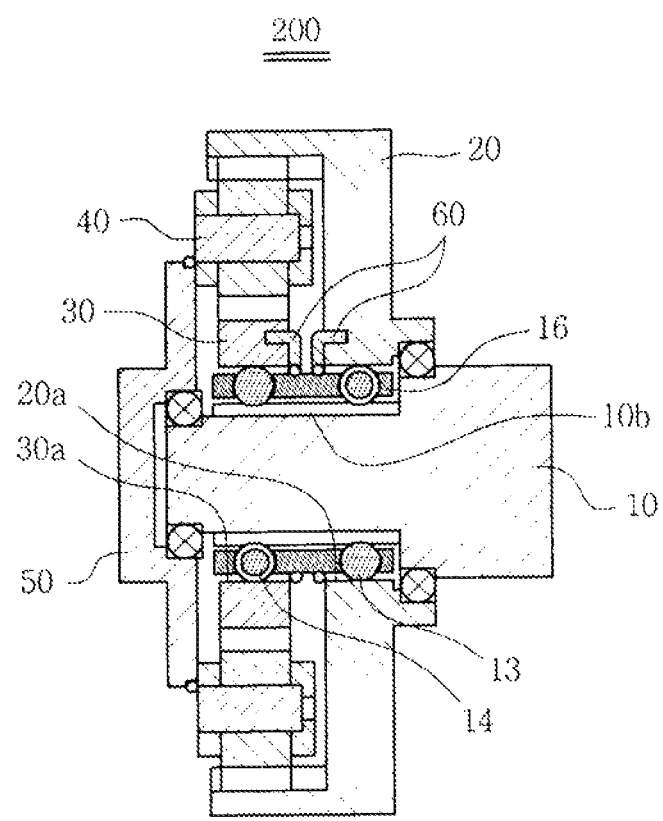
FIG. 7 is a sectional view showing a speed controller for motor preventing interference from reverse input according to a second embodiment of the present invention.
Figure 8:
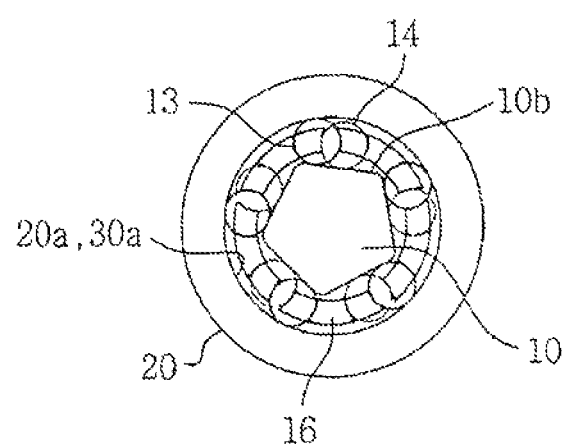
FIG. 8 is a side view showing a ball-mounting ring of FIG. 7.
Figure 9:
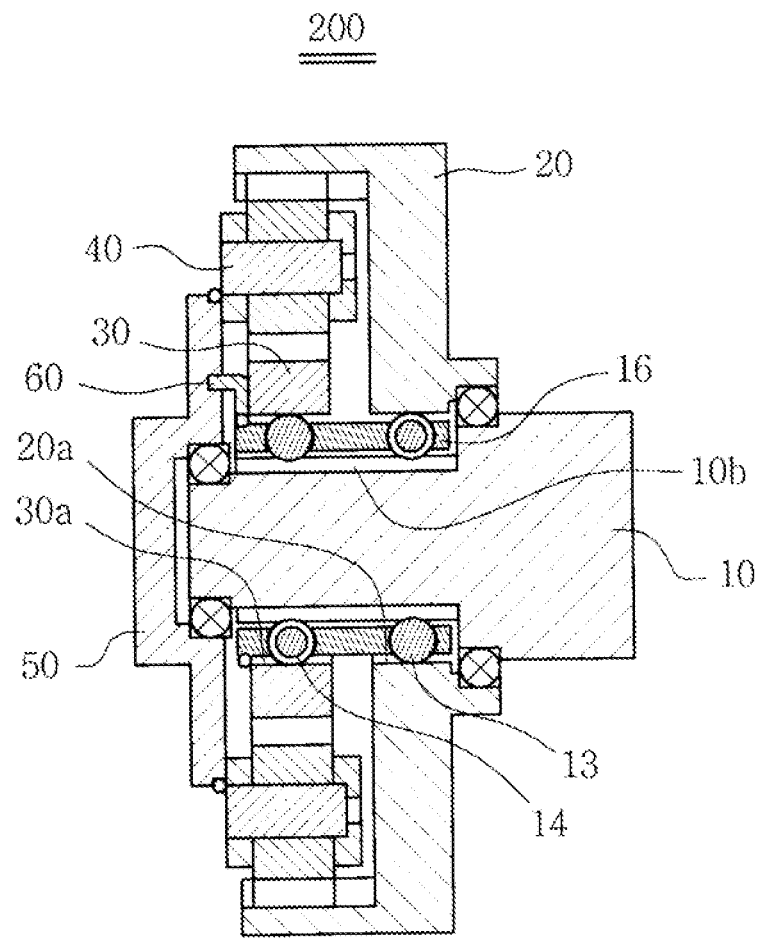
FIG. 9 is a sectional view showing another example wherein a friction pin shown in FIG. 7 is mounted.

FIG. 7 is a sectional view showing a speed controller for motor preventing interference from reverse input according to the second embodiment of the present invention, FIG. 8 is a side view showing a major portion of a ball-mounting ring of FIG. 7, and FIG. 9 is a sectional view showing another example wherein a friction pin shown in FIG. 7 is mounted.

Referring to FIGS. 7 and 8, the speed controller 200 for motor preventing interference from reverse input according to the second embodiment of the present invention includes a driving shaft 10 rotating in normal and reverse directions, a ball-mounting ring 16 surrounding an outer circumference of the driving shaft 10, constant speed balls 13 and speed changing balls 14 coupled to the ball-mounting ring 16, an output cover 20 restricted at a portion 20*a* to the constant speed balls 13, a sun gear 30 restricted at a portion 30*a* to the speed changing balls 14, a planetary gear 40 engaged with the sun gear 30 at its inner side and the output cover 20 at its outer side, and a friction pin 60 for giving a frictional force to the ball-mounting ring 16.

First, the rotation is transmitted from the driving shaft 10 to the output cover 20 and the sun gear 30 by means of the ball-mounting ring 16 surrounding the driving shaft 10 and the constant speed balls 13 and the speed changing balls 14 mounted to the ball-mounting ring 16.

The speed controller 200 for motor preventing interference from reverse input according to the second embodiment of the present invention transmits rotation in such a manner that the driving shaft 10 surrounded by the ball-mounting ring 16 is formed to have a polygonal outer circumference 10*b* and the constant speed balls 13 and the speed changing balls 14 are caught between the upper restriction portions 20a and 30a and the polygonal outer circumference 10b.

Thus, the constant speed balls 13 and speed changing balls 14 of the same in number as sides of the polygonal outer circumference 10b are mounted to the ball-mounting ring 16 such that their upper and lower sides partially protrude to the outside. The constant speed ball 13 and the speed changing ball 14 are mounted not coaxially but adjacently. Preferably, a distance between the constant speed ball 13 and the speed changing ball 14 adjacent to each other is smaller than a length of one side of the polygonal outer circumference 10b, and the constant speed ball 13 and the speed changing ball 14 are designed to be spaced apart from the restriction portions 20a and 30a when being located at the center of the side of the outer circumference 10b.

Also, a friction pin 60 is mounted to the ball-mounting ring 16 to give friction force thereto such that it does not run idle, as in the first embodiment. The friction pin 60 may be fixed to the rotating sun gear 30 and the output cover 20 or may be fixed to the fixed frame 50.

Figure 10:
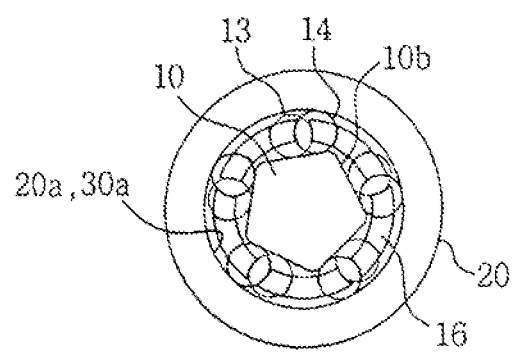
FIGS. 10 and 11 are side views illustrating the operation of the ball-mounting ring of FIG. 7.
Figure 11:
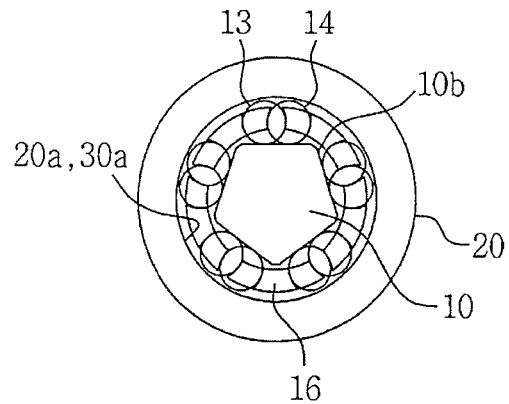

FIGS. 10 and 11 are side views illustrating the operation of the speed controller for motor preventing interference from reverse input according to the second embodiment of the present invention.

In the speed controller 200 for motor preventing interference from reverse input according to the second embodiment of the present invention, when the driving shaft 10 stops while rotating in the normal direction, the constant speed ball 13 adjacent to a vertex of the outer circumference 10b of the driving shaft 10 is caught to be restricted at the portion 20a to the output cover 20 as shown in FIG. 8. Also, the speed changing ball 14 is located at the center of the side of the outer circumference 10b of the driving shaft 10 to become free.

In such a state, if rotation is reversely transferred from the outer cover 20 counterclockwise, the output cover 20 reversely transmits rotation toward the constant speed ball 11 and the planetary gear 40.

First, the rotation reversely input from the output cover 20 to the constant speed ball 13 is restricted at the portion 20a to the constant speed ball 13 while rotating counterclockwise, and the restricted constant speed ball 13 is rotated counterclockwise together with the ball-mounting ring 16 and the driving shaft 10.

Then, the rotation reversely input from the output cover 20 toward the planetary gear 40 rotates counterclockwise and makes the planetary gear 40 rotate clockwise, and the planetary gear 40 rotates the sun gear 30 counterclockwise. Also, the sun gear 30 rotating counterclockwise is not restricted at the portion 30a to the speed changing ball 14 but runs idle, thereby not transferring the reversely input rotation toward the driving shaft 10.

Meanwhile, in the speed controller 200 for a motor, when the driving shaft 10 stops while rotating in the reverse direction, the speed changing ball 14 is caught to be restricted as shown in FIG. 10, and the constant speed ball 13 becomes free. Also, if the driving shaft 10 stops intermediately while rotating in either the normal direction or the reverse direction, both of the constant speed ball 13 and the speed changing ball 14 become free.

Thus, in the speed controller 200 for a motor according to the second embodiment of the present invention, one or both of the constant speed ball 13 and the speed changing ball 14 become free in any state, even when rotation is reversely input from the outside.

Figure 12:
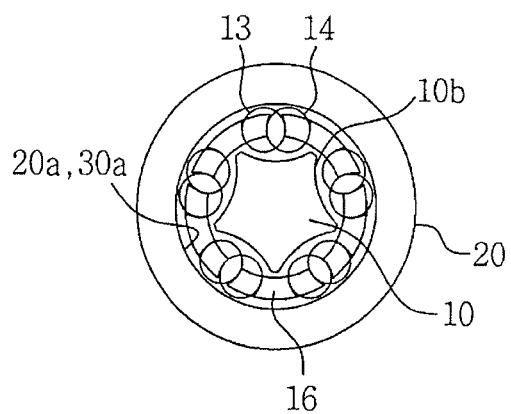
FIGS. 12, 13 and 14 are views of modifications of the polygonal outer circumference of a driving shaft shown in FIG. 8.
Figure 13:
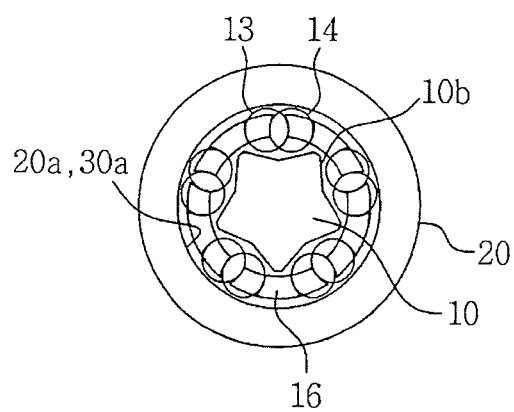
Figure 14:
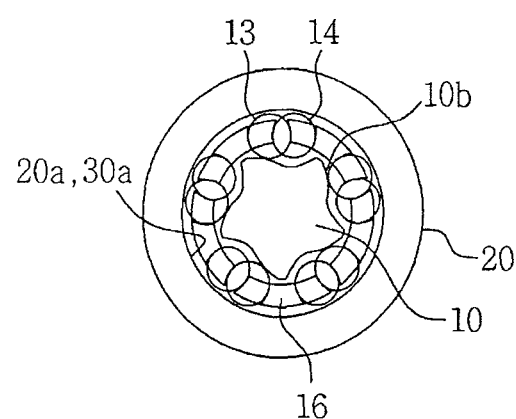

FIGS. 12 to 14 are views showing modifications of the outer circumference of the driving shaft in the speed controller for motor preventing interference from reverse input according to the second embodiment of the present invention.

That is, in the speed controller 200 for motor preventing interference from reverse input according to the second embodiment of the present invention, the driving shaft 10 basically has a polygonal outer circumference 10b, but the polygonal outer circumference 10b may have concave sides as shown in FIG. 12. Alternatively, the polygonal outer circumference 10b may have concavely angled sides as shown in FIG. 13. Moreover, the polygonal outer circumference 10b may also have wave-shaped sides as shown in FIG. 14.

As mentioned above, the speed controller for motor preventing interference from reverse input according to the present invention is configured such that at least one of two pawls is not restricted, thereby preventing a shut-down of the operation of the speed controller although rotation is reversely input from an output side.

Although the present invention has been described in connection with the preferred embodiments, it will be understood by those skilled in the art that various modifications and changes can be made thereto without departing from the spirit and scope of the invention defined by the appended claims.

What is claimed is:

1. A transmission for a motor comprising:
   a driving shaft that has a polygonal outer circumference; and
   a ball-mounting ring coupled to the outer circumference, the ball-mounting ring including a constant speed ball and a speed changing ball spaced apart from each other by a predetermined distance so that upper and lower sides of them protrude, and the ball-mounting ring frictionally fixed by a friction pin to give friction force to the ball-mounting such that the ball-mounting ring does not return or run idle,
   whereby at least one of the constant speed ball and the speed changing ball escapes from the outer circumference according to a rotation direction of the driving shaft,
   thereby the transmission gives a normal rotation and constant speed output to an output cover when the driving shaft of the motor rotates in a normal direction and a normal rotation and speed-changed output to the output cover when the driving shaft of the motor rotates in a reverse direction.

* * * * *